United States Patent [19]

Fukuda

[11] Patent Number: 5,715,645

[45] Date of Patent: Feb. 10, 1998

[54] DEVICE FOR SETTING SEAL TEMPERATURES AND PACKAGING MACHINE PROVIDED WITH SAME

[75] Inventor: Masao Fukuda, Shiga, Japan

[73] Assignee: Ishida Co., Ltd., Japan

[21] Appl. No.: 196,688

[22] Filed: Feb. 15, 1994

[30] Foreign Application Priority Data

Mar. 24, 1993 [JP] Japan ................. 5-089371

[51] Int. Cl.$^6$ ................. B65B 57/00
[52] U.S. Cl. ................. 53/75; 53/551; 53/552; 53/374.6
[58] Field of Search ................. 219/388, 243, 219/497; 493/1, 2; 53/550, 551, 552, 75, 373.7, 374.8, 374.6

[56] References Cited

U.S. PATENT DOCUMENTS

| | | | |
|---|---|---|---|
| 3,348,474 | 10/1967 | Virta et al. | 53/373.7 |
| 3,925,139 | 12/1975 | Simmons | 53/75 |
| 5,036,181 | 7/1991 | Fishman | 219/497 |
| 5,279,098 | 1/1994 | Fukuda | 53/451 |
| 5,280,422 | 1/1994 | Moe et al. | 219/497 |
| 5,321,230 | 6/1994 | Shanklin et al. | 53/373.7 |
| 5,334,817 | 8/1994 | Nakamori et al. | 219/497 |

*Primary Examiner*—John Sipos
*Assistant Examiner*—Gene L. Kim
*Attorney, Agent, or Firm*—Majestic, Parsons, Siebert & Hsue P.C.

[57] ABSTRACT

A bag maker-packaging machine uses three heaters to make bags, one for longitudinal sealing and two for transverse sealing. A device for automatically setting the temperatures of these three heaters includes a memory which stores temperature data from which an operator can retrieve a standard temperature, to which the longitudinal seal heater is to be set, by specifying the characteristics of the material to be used for making bags. Different temperatures, to which the two transverse seal heaters are to be set, are uniquely determined on the basis of the standard temperature. The standard temperature and the other temperatures thus determined may be displayed in different ways on one or more display devices.

16 Claims, 4 Drawing Sheets

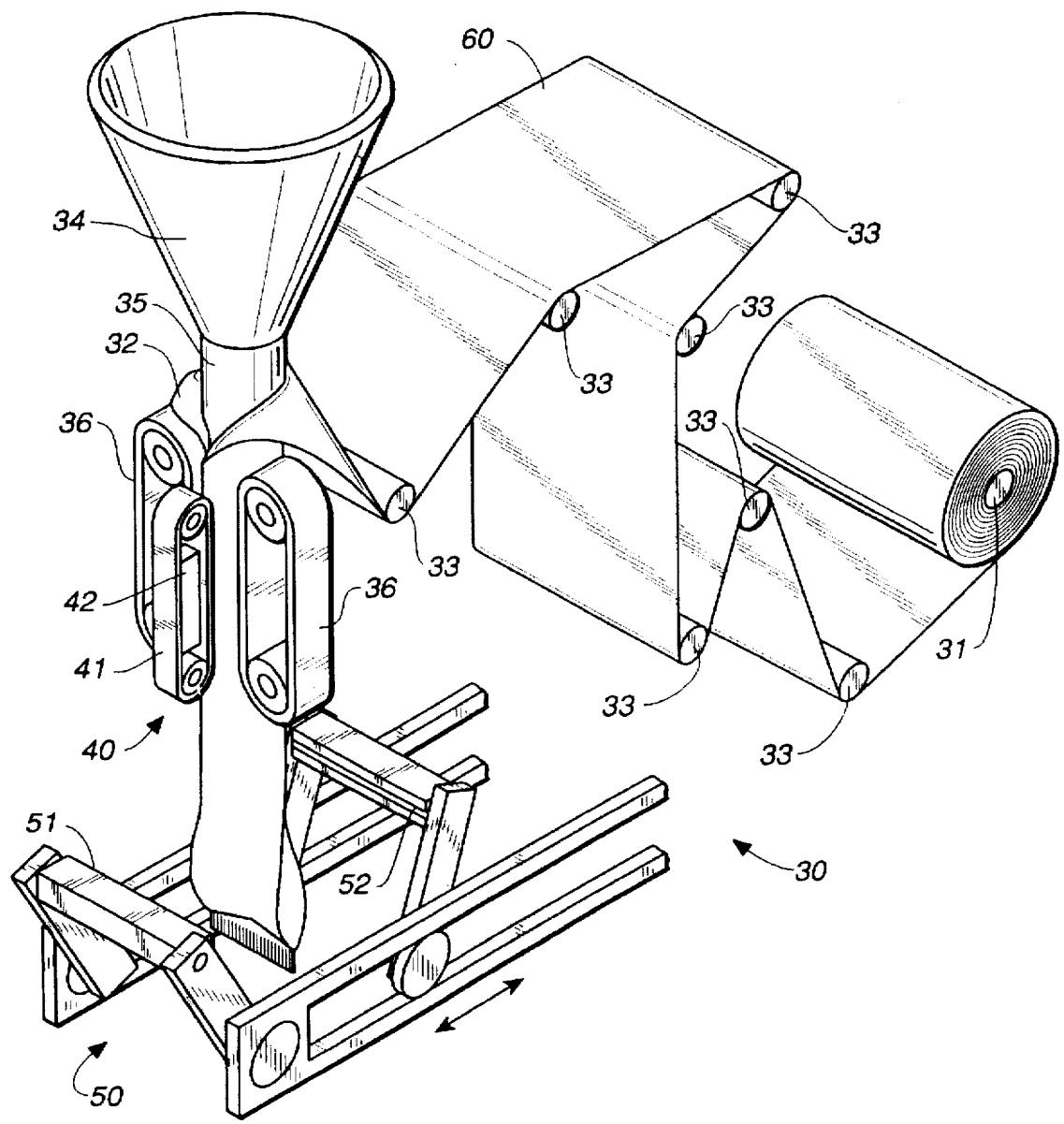
FIG._1

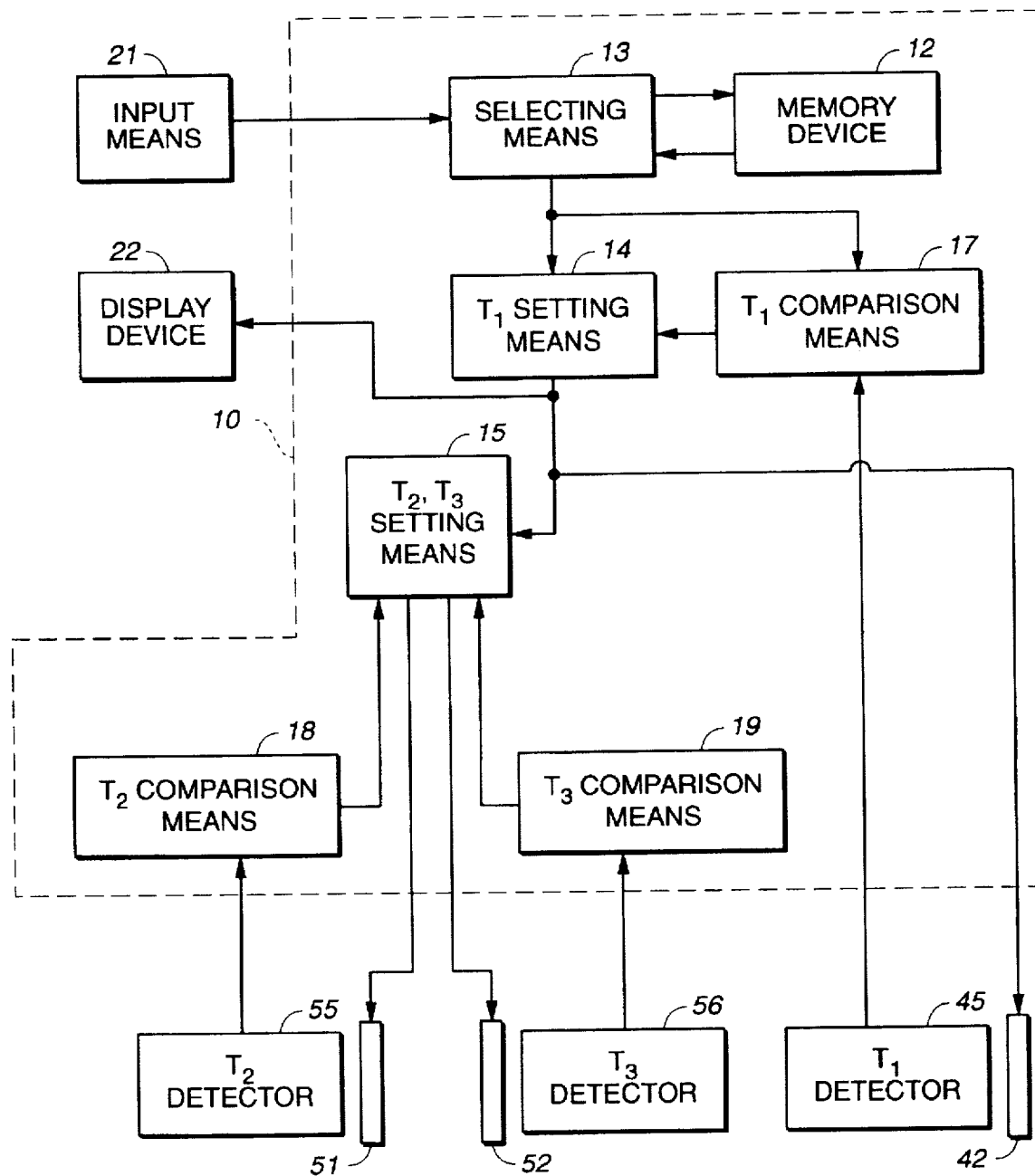
FIG._2

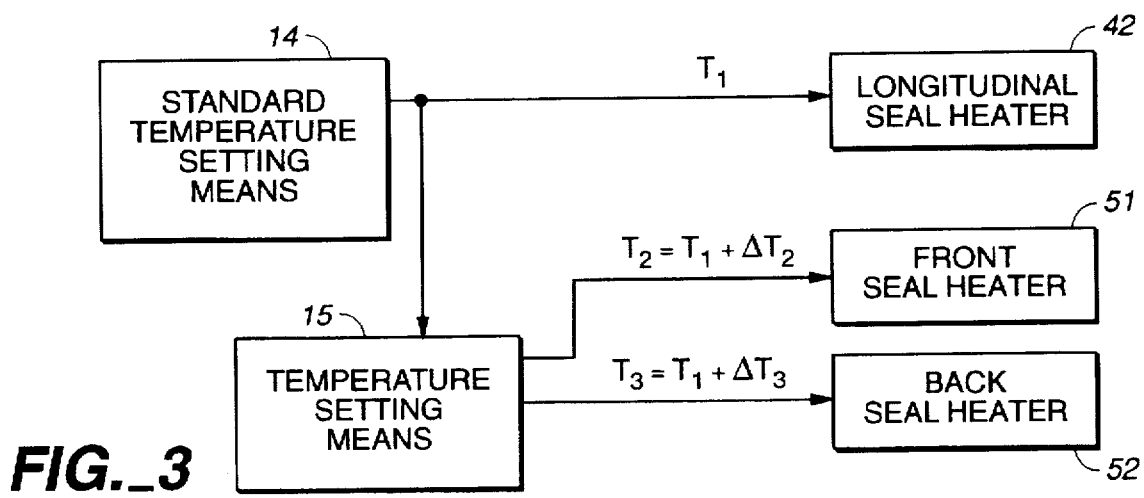
FIG._3
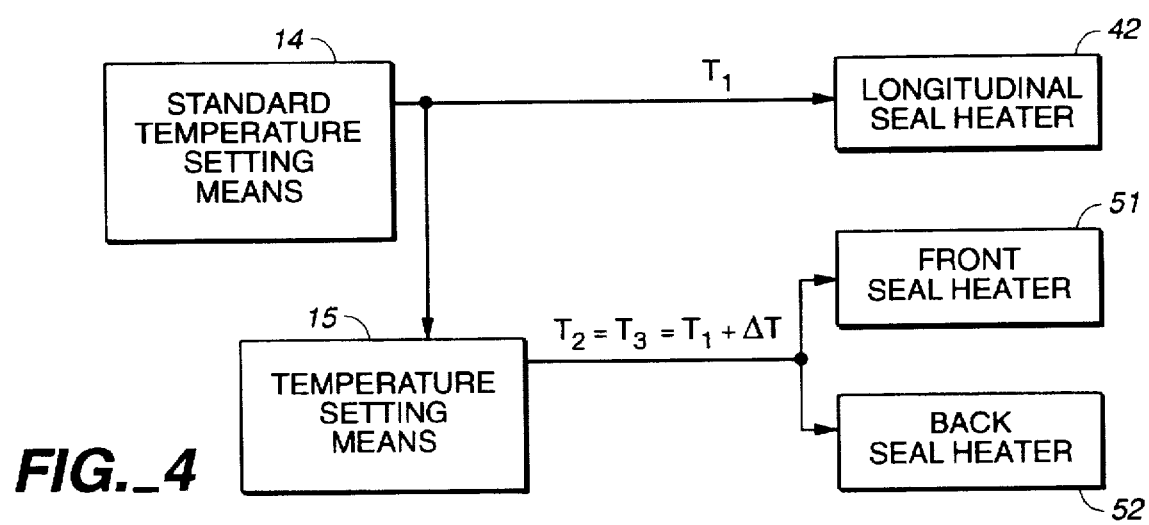
FIG._4
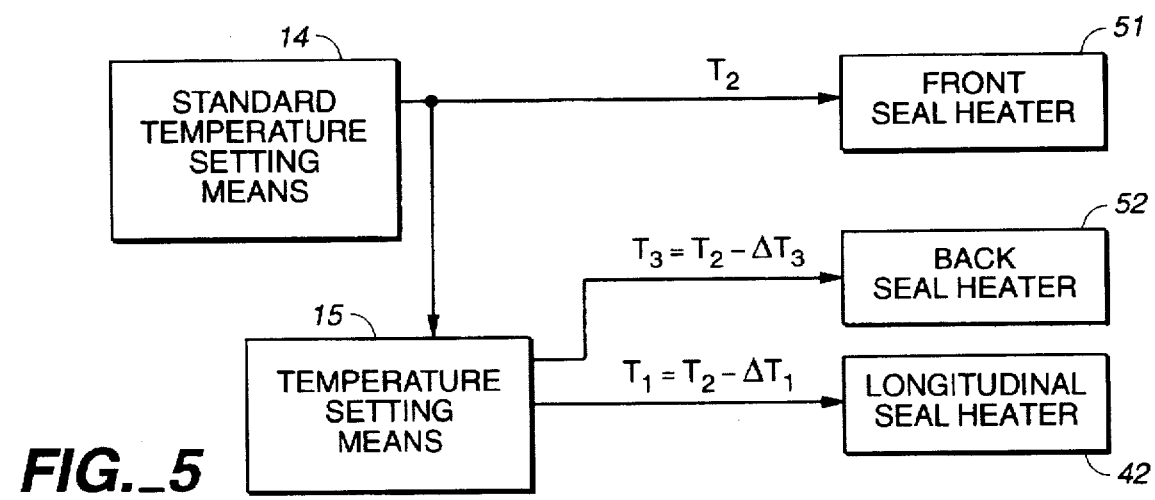
FIG._5

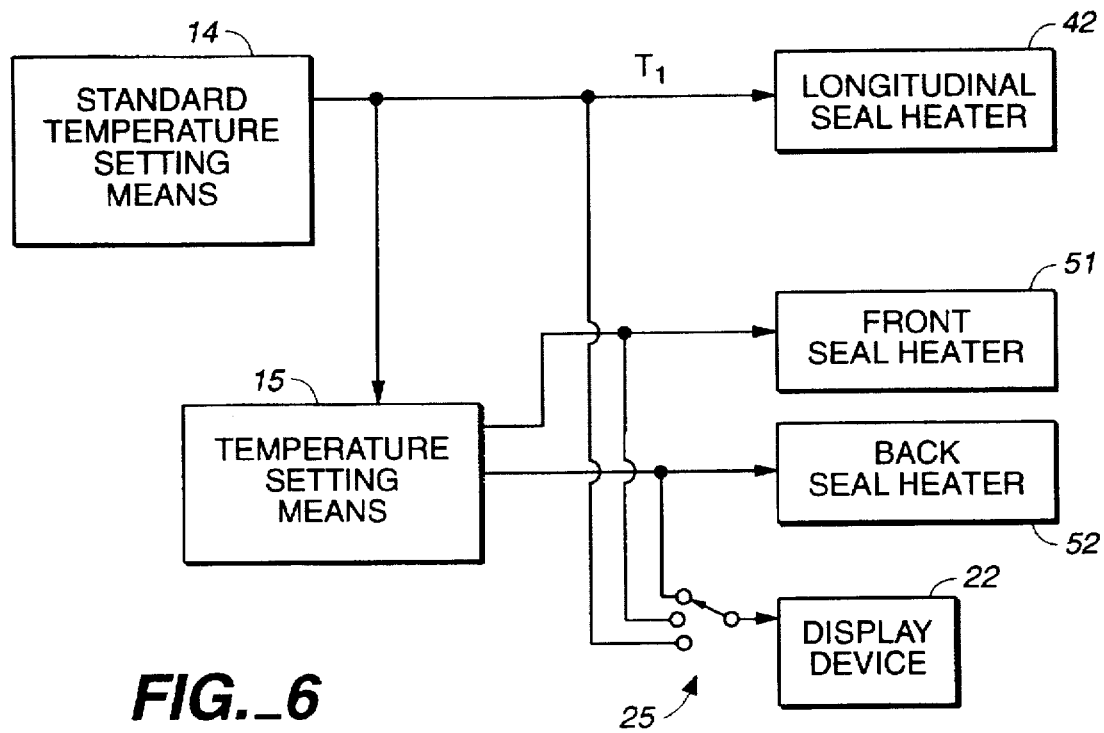
FIG._6
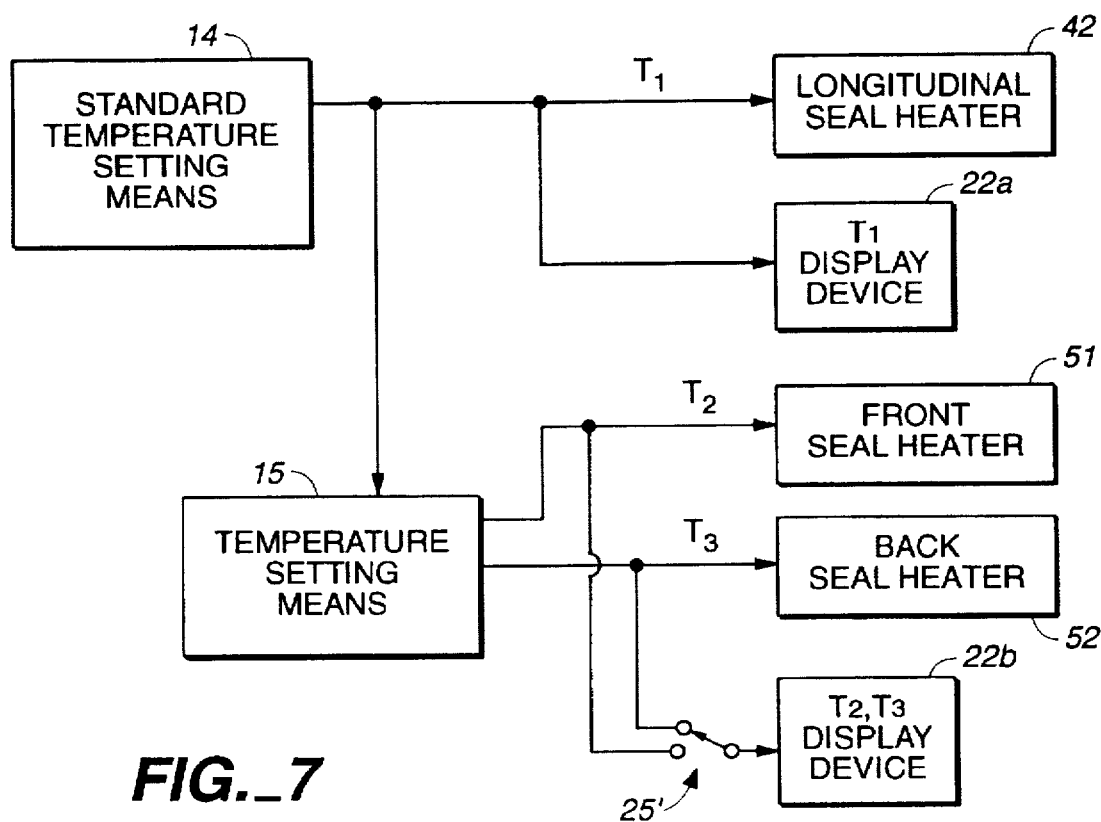
FIG._7

DEVICE FOR SETTING SEAL TEMPERATURES AND PACKAGING MACHINE PROVIDED WITH SAME

BACKGROUND OF THE INVENTION

This invention relates to a new device for setting temperatures of sealers for sealing thermoplastic film pieces together by heating them, as well as a combined bag maker and packaging machine (hereinafter simply referred to as a packaging machine) provided with such a new device.

A packaging machine of the so-called vertical pillow type, for example, is adapted to transport an elongated web of thermoplastic bag-making material (hereinafter referred to as a film) over a device called a former so as to bend it into a tubular form, to seal its mutually overlapped side edges longitudinally together while it is being transported along the circumferential surface of a loading cylinder (also referred to as a mandrel), and to simultaneously seal the top part of a bag and the bottom part of the next bag below the loading cylinder. For such an operation, the packaging machine requires a total of three heaters including a longitudinal seal heater for joining the side edges together and a pair of transverse seal heaters for sandwiching the film therebetween from both front and back directions.

Although the longitudinal seal heater is used to seal film pieces together where their total thickness hardly changes, the same is not true with the transverse seal heaters because the total thickness of the film pieces sandwiched therebetween is necessarily greater where the side edges are longitudinally overlapped one on top of the other. Since the film pieces must be sealed completely and dependably, the transverse seal heaters are generally set at a higher temperature than the longitudinal seal heater. Of the pair of transverse seal heaters, furthermore, the front heater is set at a high temperature than the back heater because the front heater serves to heat and seal the longitudinally overlapped parts directly.

The temperatures for these heaters are usually set by an operator with reference to thermometers displaying the actual temperatures of the heaters and by rotating control knobs or the like, corresponding to the material characteristics and size of the film and also by taking other operating conditions into account. Since this temperature-setting operation is an extremely cumbersome routine, there was always a high probability of operational errors.

SUMMARY OF THE INVENTION

In view of the above, it is an object of the present invention to provide a new device capable of automatically setting temperatures of these heaters if the user merely specifies the properties of the bag-making material, its size, etc.

It is another object of the invention to provide a packaging machine provided with such a novel device.

A device embodying the present invention, with which the above and other objects can be accomplished, may be characterized as comprising memory means for storing temperature data corresponding to various kinds of film, first temperature setting means for selecting a data entry from the memory means corresponding to a specified kind of film and setting the temperature of one of seal heaters as the standard temperature, and second temperature setting means for setting the temperatures of the other seal heaters on the basis of this standard temperature. With a device thus structured, the temperatures of the seal heaters can be automatically set according to the characteristics, size, etc. of the film specified by the user to be used.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a schematic perspective view of a portion of a packaging machine incorporating a device according to the present invention;

FIG. 2 is a block diagram of the device embodying the invention, incorporated in the packaging machine of FIG. 1;

FIG. 3 is a portion of the block diagram of FIG. 2, showing a temperature setting routine for the circuit;

FIG. 4 is a block diagram of a portion of a device according to another embodiment of the invention regarding temperature setting routine;

FIG. 5 is a block diagram of a portion of still another device according to the invention having a different temperature setting routine;

FIG. 6 is a block diagram of a portion of a device embodying the invention, inclusive of a display device; and FIG. 7 is a block diagram of a portion of another device embodying the invention, inclusive of another kind of display device.

DETAILED DESCRIPTION OF THE INVENTION

FIG. 1 shows a portion of a so-called vertical pillow type form-fill-seal packaging machine 30, such as described in U.S. Pat. No. 5,279,098 issued Jan. 18, 1994 (to be incorporated herein by reference), which may incorporate a device according to the present invention to be described in detail below. The packaging machine 30 comprises a holder shaft 31 for supporting a film supply roll around which a film 60 is wound, a former 32 for bending the film 60 pulled out of the supply roll into a tubular shape, a plurality of guide rolls 33 for directing the film 60 from the film supply roll to the former 32, a hopper 34 disposed above the former 32 for receiving articles to be packaged, a loading cylinder (also sometimes called a mandrel) 35 which is a tubular structure disposed below the hopper 34 for passing therethrough the articles received by the hopper 34 into a bag being formed, a pair of pull-down belts 36 for pulling the film 60 downward along the external Circumferential surface of the loading cylinder 35, a longitudinal sealer 40 disposed close to the loading cylinder 35 for sealing mutually overlapped side edges of the tubularly formed film 60, and a transverse sealer 50 disposed below the longitudinal sealer 40 (that is, on the downstream side of the latter with respect to the direction of motion of the film 60) for sealing the cylindrically formed film 60 transversely to simultaneously close the top edge of the bag which has been filled and the bottom edge of the next bag which is about to be filled. The longitudinal sealer 40 includes an endless belt 41 which is vertically stretched between two pulleys and a seal heater 42 (or "longitudinal seal heater") disposed inside the trajectory of the endless belt 41. The transverse sealer 50, on the other hand, includes a pair of transversely (with respect to the direction of motion of the film 60) elongated seal heaters 51 and 52 (or "front and back seal heaters", respectively) supported on opposite sides of the downwardly moving film 60 by a mechanism adapted to keep the two heaters 51 and 52 parallel to each other and move them towards and away from each other.

As shown schematically in FIG. 2, the operation of the packaging machine 30 is controlled by a control system which includes a temperature setting circuit 10, an input means 21 such as a control panel, temperature detectors 45, 55 and 56 for detecting the temperatures of the seal heaters 42, 51 and 52, respectively, and a display device 22 of a known kind. The temperature setting circuit 10 serves to set the temperature $T_1$ of the longitudinal seal heater 42 as a standard temperature and to set the temperatures $T_2$ and $T_3$ respectively of the front and back seal heaters 51 and 52 on the basis of this standard temperature. For this purpose, the temperature setting circuit 10 is adapted to receive from the input means 21 a film-specifying signal indicative of physical properties (such as thickness and size) of the film 60 to be made into bags, and temperature signals from the temperature detectors 45, 55 and 56 indicative of the temperatures detected thereby respectively of the longitudinal and transverse heaters 42, 51 and 52.

The temperature setting circuit 10 includes a memory device 12 of a known kind, storing temperature data for the longitudinal seal heater 42, that is, data on temperatures necessary for sealing films of different physical properties such as material, thickness and size. The temperature setting circuit 10 is also provided with a selecting means 13 and a standard temperature setting means 14 (indicated in FIG. 2 as $T_1$ setting means). When a film-specifying signal is received from the input means 21, the selecting means 13 serves to select from the memory device 12 a temperature data item corresponding thereto and to output it to the standard temperature setting means 14. The standard temperature setting means 14 thereupon causes the temperature thus selected to be displayed on the display device 22 and controls the voltage to be supplied to the longitudinal seal heater 42, or the standard voltage or current to be supplied thereto.

The temperature setting circuit. 10 further includes a transverse seal heater temperature setting means 15 (indicated in FIG. 2 as $T_2$, $T_3$ setting means) for setting the temperatures $T_2$ and $T_3$ respectively of the front and back seal heaters 51 and 52 uniquely on the basis of the standard temperature $T_1$ set by the standard temperature setting means 14. As shown schematically in FIG. 3, the transverse seal heater temperature setting means 15 may be adapted to set temperatures $T_2$ and $T_3$ uniquely by adding predetermined differential values $\Delta T_2$ and $\Delta T_3$, respectively, to the standard temperature $T_1$. For example, $\Delta T_2$ and $\Delta T_3$ may be respectively in the range of 5°–10° C. and 2°–5° C.

The temperature setting circuit 10 also includes a comparison means 17 (indicated in FIG. 2 as $T_1$ comparison means) which, together with the temperature detector 42, forms a feedback circuit for causing the standard temperature setting means 14 to adjust the temperature of the longitudinal seal heater 42, as detected by the temperature detector 45, to the standard temperature $T_1$ determined by the selecting means 13. For this purpose, the temperature signal outputted from the temperature detector 45 is received by the comparison means 17 and thereby compared with the output signal from the selecting means 13 indicative of the standard temperature $T_1$. The result of this comparison is received by the standard temperature setting means 14, which relies thereupon to adjust the temperature of the longitudinal seal heater 42.

Additional feedback circuits are formed for similarly adjusting the temperatures of the transverse seal heaters 51 and 52. For this purpose, the temperature setting circuit 10 further includes additional comparison means 18 and 19 (indicated in FIG. 2 respectively as $T_2$ comparison means and $T_3$ comparison means). Although not shown in FIG. 1, the transverse sealer 50 includes temperature detectors (shown in FIG. 2 at 55 and 56) for detecting the temperatures of the front and back seal heaters 51 and 52. Temperature signals indicative of the temperatures of these transverse seal heaters 51 and 52 (as detected by the temperature detectors 55 and 56) are respectively received by the $T_2$ and $T_3$ comparison meads 18 and 19, and comparison signals indicative of the results of comparisons thereby are transmitted to the transverse seal heater temperature setting means 15. The temperatures of the transverse seal heaters 51 and 52 are thereby adjusted accordingly as it was explained above how the temperature of the longitudinal seal heater 42 is adjusted by a feedback method.

Next, the operation of a packaging machine thus structured will be explained in detail. Let us assume now that the kind of bags to be produced has been determined. The operator then operates the input means 21, such as a control panel, to specify the material characteristics, thickness and size of the bag-making material. In some situations, the speed of packaging operation and/or the manner of joining side edges may also be specified. As the inputted information is received by the temperature setting circuit 10, the selecting means 13 retrieves a corresponding standard seal temperature data entry from the memory device 12 and outputs the retrieved information to the standard temperature setting means 14, which thereupon determines the power to be supplied to the longitudinal seal heater 42, that is, the voltage to be applied or the current to be supplied.

As the standard seal temperature ($=T_1$) is determined, it is communicated to the transverse seal heater temperature setting means 15, which thereupon uniquely determines the temperatures $T_2$ and $T_3$ at which the front and back transverse seal heaters 51 and 52 are to be set. For example, $T_2$ may be determined by adding a predetermined differential value ($=\Delta T_2$) in the range of 5°–10° C. to the standard temperature, and $T_3$ by adding another predetermined differential value ($=\Delta T_3$) in the range of 2°–5° C. to the standard temperature.

After the standard seal temperature $T_1$ and the target temperatures $T_2$ and $T_3$ are thus determined, the three feedback circuits, each comprising a temperature detector 45, 55 or 56 and a temperature comparison means 17, 18 or 19, function in known ways to adjust the temperatures of the seal heaters 42, 51 and 52 respectively to the standard seal temperature $T_1$ and the target temperatures $T_2$ and $T_3$ as determined above.

Although the present invention was described above by way of only one embodiment, this is intended to be merely illustrative. Many modifications and variations can be effected within the scope of the invention. When envelope-like bags are to be produced for packaging, for example, such that there is no significant need to keep the front and back transverse seal heaters 51 and 52 at different temperatures, the transverse seal heater temperature setting means 15 may be programmed to calculate a single differential value $\Delta T$ to be added to the standard temperature $T_1$, as schematically illustrated in FIG. 4, to determine $T_2=T_3=T_1+\Delta T$.

As another example, it need not be the temperature $T_1$ of the longitudinal seal heater 42 that should be determined as the standard temperature. FIG. 5 shows an alternative temperature setting routine whereby the temperature $T_2$ for the front seal heater 51 is treated as the standard temperature and the temperatures $T_1$ and $T_3$ respectively of the longitudinal seal heater 42 and the back seal heater 52 are uniquely determined on the basis of the standard temperature $T_2$, that is, $T_3$ is obtained by subtracting a predetermined differential temperature value $\Delta T_3$ in a range, say, of 3°–5° C. from the standard temperature $T_2$ (or $T_3=T_2-\Delta T_3$), and $T_1$ is obtained by subtracting another predetermined differential temperature value $\Delta T_1$ in a range, say, of 5°–10° C. from the standard temperature $T_2$ (or $T_1=T_2-\Delta T_1$). A block diagram for showing the temperature setting circuit according to this variation will be obtained from FIG. 2 simply by mutually exchanging the heaters 42 and 51 and the temperature detectors 45 and 55. Such a redrawn diagram is omitted from the disclosure.

The manner in which the display device 22 is adapted to display temperature data thereon is not intended to limit the scope of the invention. According to another embodiment of the invention disclosed in FIG. 6, for example, the display device 22 is connected to the standard temperature setting means 14 and the transverse seal heater temperature setting means 15 through a three-way switch 25 such that one of the three output signals indicative of the temperatures $T_1$, $T_2$ and $T_3$ can be selectively displayed, say, together with the identity of the corresponding heater.

Still another way of displaying temperature data, as shown in FIG. 7, is to provide two display devices 22a and 22b, one of them 22a being for displaying only the standard temperature $T_1$ at which the longitudinal seal heater 42 is to be set, and the other 22b being connected to the transverse seal heater temperature setting means 15 through a two-way switch 25' such that the temperature $T_2$ or $T_3$ set for either of the transverse seal heaters 51 and 52 can be selectively displayed together with the identity of the corresponding heater by operating the switch 25'.

It is also to be noted that the manner of using the standard temperature, at which one of the three heaters 42, 51 and 52 is set, to uniquely determine the temperatures of the other two heaters is not limited by the disclosure given above. In all of the examples illustrated above, predetermined differential temperature values were added to or subtracted from the standard temperature to set the temperatures for the remaining heaters, but the present invention requires only that the temperatures to be set according to the standard temperature be a single-value function of the standard value. Addition of a predetermined constant is merely an example of such a functional relationship. Alternatively, the temperatures to be set according to the standard temperature may be obtained by multiplying the standard temperature by predetermined multiplicative constants.

In summary, all such modifications and variations on the disclosures given above, which may be apparent to a person skilled in the art, are intended to be included within the scope of the invention.

What is claimed is:

1. In combination with a bag maker-packaging machine comprising three heaters including a longitudinal heater for sealing elongated film pieces longitudinally and front and back transverse heaters for sealing said film pieces transversely, a device for setting temperatures of said three heaters, said device comprising:

memory means for storing temperature data corresponding to different kinds of bag-making materials;

standard setting means for retrieving from said memory means a data item corresponding to a specified kind of bag-making material, said retrieved data item serving as a standard temperature and associated with specified one of said three heaters; and temperature setting means for calculating two temperature values individually for the other two of said three heaters according to said standard temperature.

2. The device of claim 1 wherein said standard setting means further serves to adjust the temperature of said specified one of said three heaters to said standard temperature.

3. The device of claim 2 wherein said temperature setting means further serves to adjust the temperatures of said other two heaters according individually to said uniquely determined two temperature values.

4. The device of claim 1 wherein said specified one is said longitudinal heater.

5. The device of claim 1 wherein said temperature setting means calculates said two temperature values by adding or subtracting predetermined differential temperature values to or from said standard temperature.

6. The device of claim 1 further comprising input means for allowing an operator to select said specified kind of bag-making material.

7. The device of claim 1 further comprising display means for displaying at least either said standard temperature or said two calculated temperature values.

8. The device of claim 1 further comprising first display means for displaying said standard temperature by receiving a temperature signal from said standard setting means and second display means for displaying said two calculated temperature values by receiving temperature signals from said temperature setting means.

9. A packaging machine comprising:

a loading cylinder for causing articles to pass therethrough to be packaged in bags;

a film supporting means for supporting a roll of bag-making material;

pulling means for pulling said bag-making material from said roll;

a former for forming said bag-making material into a tubular shape around said loading cylinder;

film guiding means for guiding said bag-making material to said former;

three seal heaters including a longitudinal heater for sealing side edges of said tubularly formed bag-making material together and two transverse heaters for sealing said tubularly formed bag-making material therebetween transversely to the direction of motion thereof; and a temperature setting device for setting temperatures of said three heaters, said device comprising:

memory means for storing temperature data corresponding to different kinds of bag-making materials;

standard setting means for retrieving from said memory means a data item corresponding to a specified kind of bag-making material, said retrieved data item serving as a standard temperature and associated with specified one of said three heaters; and temperature setting means for calculating two temperature values individually for the other two of said three heaters according to said standard temperature.

10. The device of claim 9 wherein said standard setting means further serves to adjust the temperature of said specified one of said three heaters to said standard temperature.

11. The device of claim 10 wherein said temperature setting means further serves to adjust the temperatures of said other two heaters according individually to said two calculated temperature values.

12. The device of claim 9 wherein said specified one is said longitudinal heater.

13. The device of claim 9 wherein said temperature setting means calculates said two temperature values by adding or subtracting predetermined differential temperature values to or from said standard temperature.

14. The device of claim 9 further comprising input means for allowing an operator to select said specified kind of bag-making material.

15. The device of claim 9 further comprising display means for displaying at least either said standard temperature or said two calculated temperature values.

16. The device of claim 9 further comprising first display means for displaying said standard temperature by receiving a temperature signal from said standard setting means and second display means for displaying said two calculated temperature values by receiving temperature signals from said temperature setting means.

* * * * *